United States Patent
Monti (10) Patent No.: US 12,093,448 B2
(45) Date of Patent: Sep. 17, 2024

(54) INPUT GENERATION SYSTEM AND METHOD

(71) Applicant: Sony Interactive Entertainment Inc., Tokyo (JP)

(72) Inventor: Maria Chiara Monti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/728,192

(22) Filed: Apr. 25, 2022

(65) Prior Publication Data

US 2022/0350402 A1 Nov. 3, 2022

(30) Foreign Application Priority Data

Apr. 28, 2021 (GB) ...................................... 2106057

(51) Int. Cl.
*G06F 3/01* (2006.01)
*G06F 3/0346* (2013.01)

(52) U.S. Cl.
CPC ............ *G06F 3/013* (2013.01); *G06F 3/0346* (2013.01)

(58) Field of Classification Search
CPC ........ G06F 3/013; G06F 3/0346; G06F 3/038; G06F 3/01; G06F 11/36
See application file for complete search history.

(56) References Cited

U.S. PATENT DOCUMENTS

| | | | | |
|---|---|---|---|---|
| 8,487,959 | B1* | 7/2013 | Khan | G06T 11/00 |
| | | | | 345/619 |
| 10,871,823 | B1* | 12/2020 | Burgess | G06T 7/246 |
| 10,890,968 | B2* | 1/2021 | Kurlethimar | G02B 27/0101 |
| 2017/0290504 | A1* | 10/2017 | Khaderi | A63F 13/25 |
| 2018/0008141 | A1* | 1/2018 | Krueger | A61B 3/0025 |
| 2018/0061084 | A1* | 3/2018 | Mitchell | G06T 13/00 |
| 2018/0307304 | A1* | 10/2018 | Bronder | A63F 13/5255 |
| 2020/0209958 | A1* | 7/2020 | Sztuk | A63F 13/26 |
| 2021/0325963 | A1* | 10/2021 | Hudman | G02B 27/0093 |

OTHER PUBLICATIONS

Mardanbegi Diako D, "EyeMRTK a toolkit for developing eye gaze interactive applications in virtual and augments reality" Proceedings of the Genetic and Evolutionary Computation Conference, 5 pages, Jan. 2019.
Anonymous "Simulating gaze, tap etc while developing for Gear VR—Unity Forum" URL: https://forum.unity.com/threads/simulating-gaze-tap-etc-while-developing-for-gear-vr.381346/, 1 page, (Jan. 2017).
D. Martin, et al., "ScanGAN360: A Generative Model of Realistic Scanpaths for 360° Images" in IEEE Transactions on Visualization and Computer Graphics, vol. 28, No. 5, 45 pages, May 2022.

(Continued)

*Primary Examiner* — Bryan Earles
(74) *Attorney, Agent, or Firm* — Matthew B. Dernier, Esq.

(57) ABSTRACT

An input generation system operable to generate one or more inputs for a gaze tracking system, includes an input receiving unit operable to receive one or more inputs, an input processing unit operable to generate motion data in dependence upon the received inputs, where the motion data comprises simulated gaze information, and an output unit operable to output the generated motion data.

13 Claims, 5 Drawing Sheets

(56) References Cited

OTHER PUBLICATIONS

Combined Search and Examination Report for corresponding GB Application No. GB2106057.9 8 pages, dated Feb. 1, 2022.
Anonymous "Simulating gaze, tap etc while developing for Gear VR—Unity Forum" URL: https://forum.unity.com/threads/simulating-gaze-tap-etc-while-developing-for-gear-vr.381346/, 2 pages, (Jan. 2017).
D. Martin, et al., "ScanGAN360: A Generative Model of Realistic Scanpaths for 360° Images" in IEEE Transactions on Visualization and Computer Graphics, vol. 28, No. 5, pp. 2003-2013, May 2022.

* cited by examiner

INPUT GENERATION SYSTEM AND METHOD

BACKGROUND OF THE INVENTION

Field of the Invention

This disclosure relates to an input generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been a significant increase in interest in head-mountable display devices (HMDs) such as augmented reality (AR) headsets and virtual reality (VR) headsets. Such devices offer a user a more immersive gaming or viewing experience (for example) relative to those presented using a more traditional display such as a television. This can be due to elements appearing to be present in the user's own environment (AR) or through an increased sense of immersion due to occupying the user's entire field of view (VR).

Many HMDs make use of gaze tracking to determine the direction of the use's gaze. This can be useful in determining where a user is focusing (for example, when determining a region of interest for foveal rendering techniques), or for enabling gaze inputs to a device to control processing. Gaze tracking may be performed using cameras mounted on the HMD, for example, which are directed towards the pupils eyes so as to detect a current location of one or more features of the eye (such as the pupil) as an indication of the current gaze direction of the user.

The use of gaze tracking methods can result in an increase in the number of inputs that are able to be provided to a system; for instance, gaze tracking can often be used in addition to other inputs such as controller operation by a user. This can increase the operational complexity of these systems, thereby increasing the amount of testing that may be required as part of a quality assurance process. This can therefore result in an increased burden upon developers of these systems.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
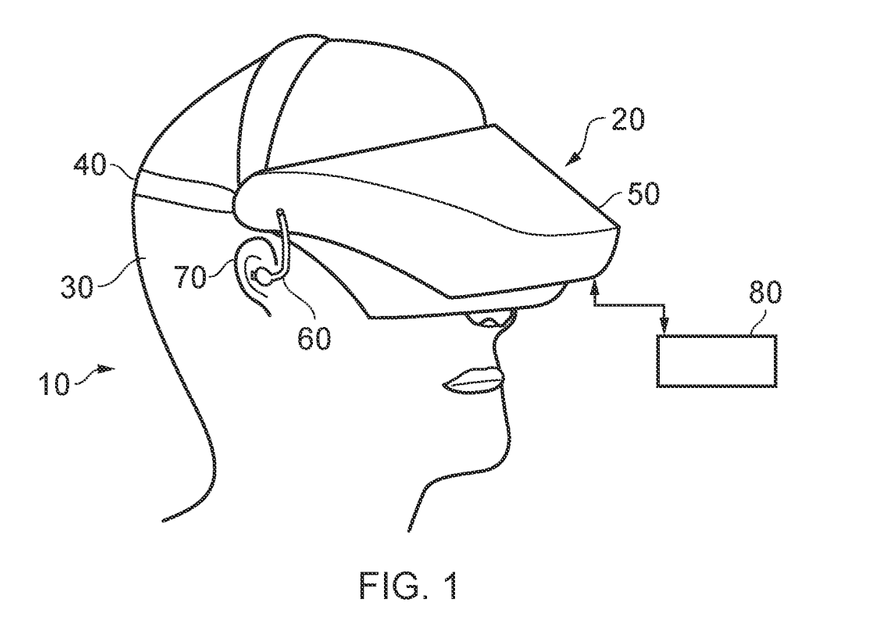
FIG. 1 schematically illustrates an HMD worn by a user.

Referring now to the drawings, wherein like reference numerals designate identical or corresponding parts throughout the several views, embodiments of the present disclosure are described. In FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
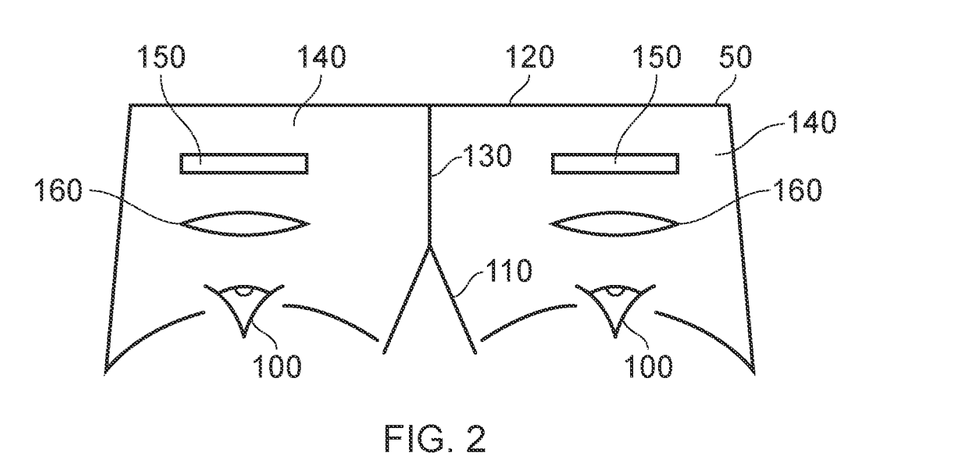
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
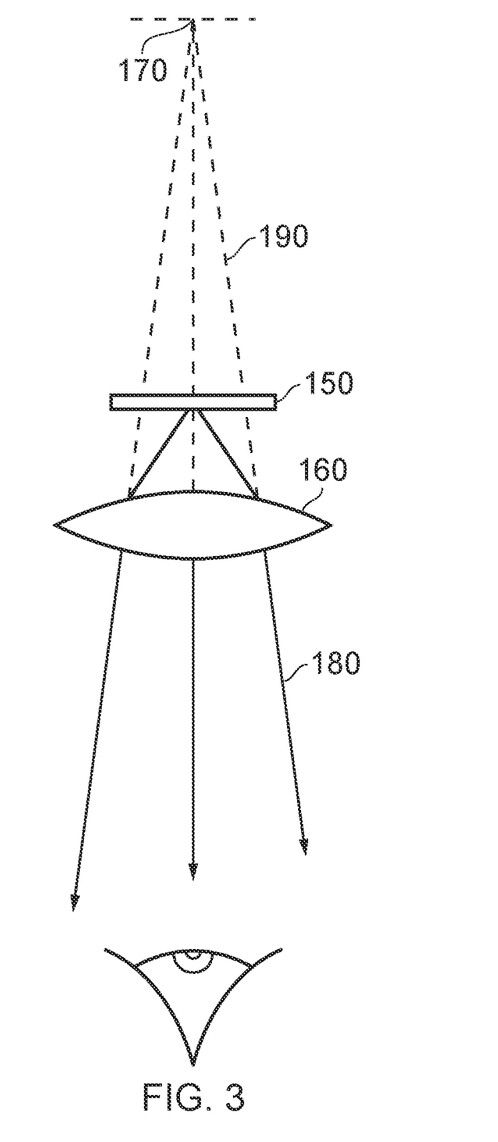
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
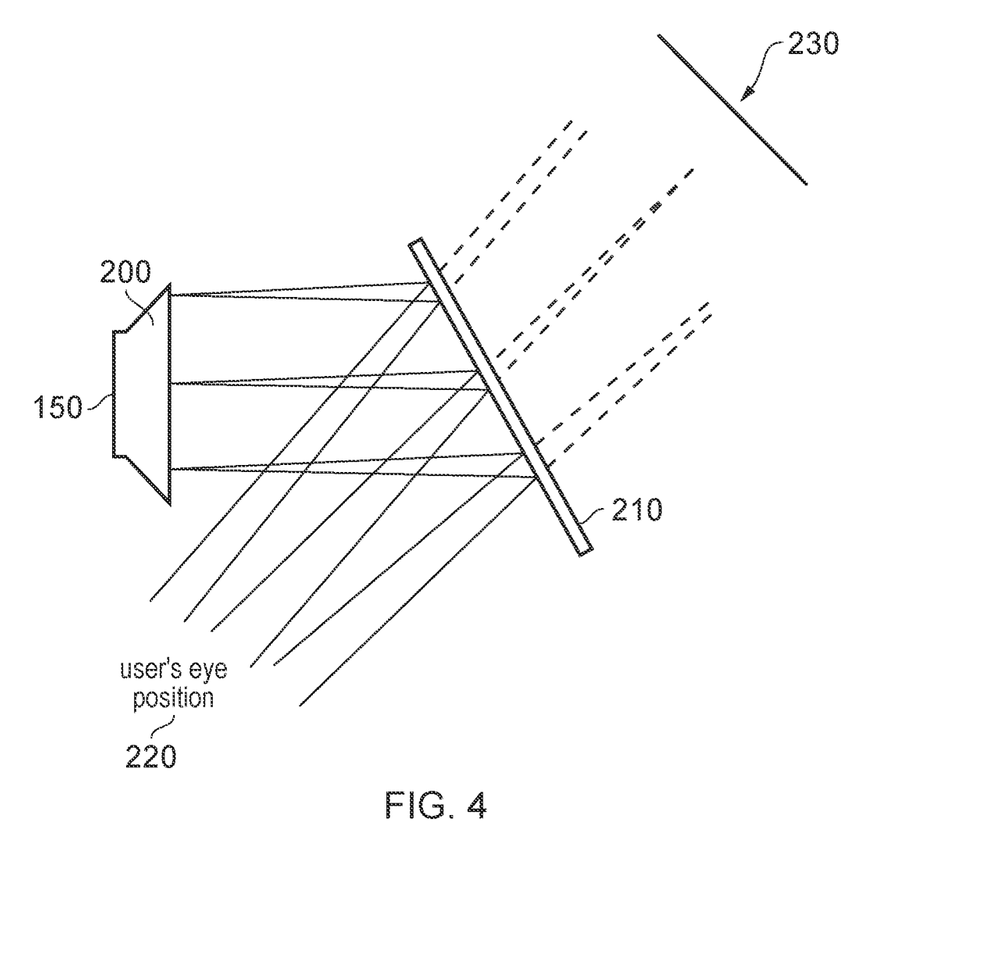
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
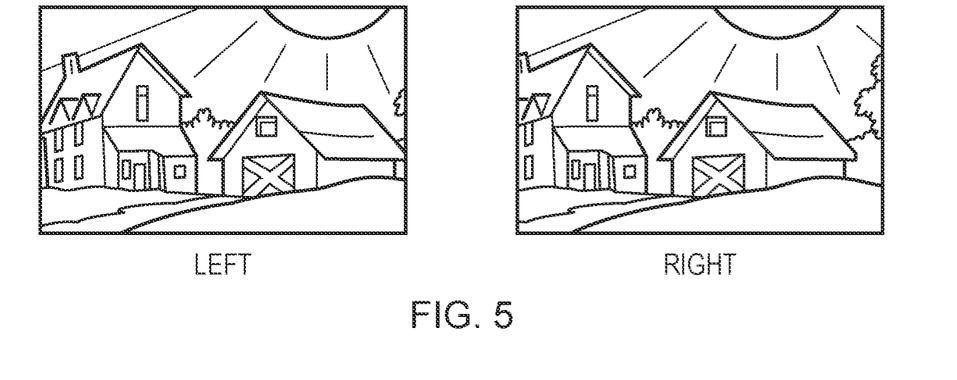
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

As discussed above, as a part of the development process it may be advantageous to perform a quality control stage in which the functionality of gaze tracking in a particular context is able to be determined. Traditionally, this comprises the generation of playtest data through users interacting with the system comprising the gaze tracking. However, such a process can be extremely time consuming, given the range of possible interactions and the variation between interactions of different users responding to the same stimuli. Therefore it may be considered advantageous to provide an alternative to the generation of playtest data in this manner.

Figure 6:
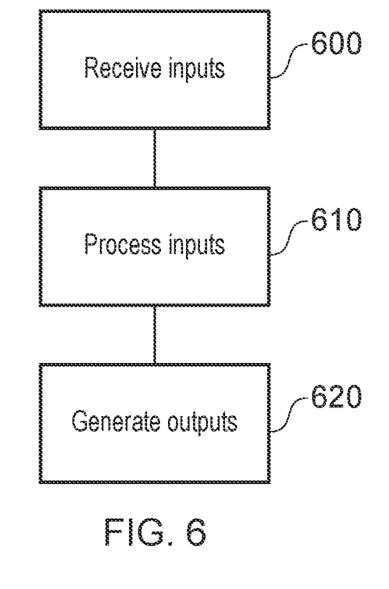
FIG. 6 schematically illustrates a method for generating eye motion data.

FIG. 6 schematically illustrates a method for generating eye motion data in accordance with this aim. In other words, the method of FIG. 6 is able to be used to generate eye motion data without requiring any gaze tracking information to be captured for a user's eyes. Such a method may therefore be suitable for replacing, or at least complementing, traditional playtesting in which gaze tracking data is obtained through a user interacting with an HMD (or another gaze tracking device).

At a step 600 one or more inputs are received. These inputs may be provided in any suitable format, and may comprise a range of different information. For instance, in some embodiments the input may comprise a path defined via an input device (such as a gamepad or a computer mouse). Alternatively, or in addition, inputs may comprise one or more waypoints that define a path. Further inputs may be provided that act as modifiers to a defined path—for instance, a scaling factor indicating a movement speed may be provided for the path. Further information, such as a depth of the path (indicating a focus upon an object at a particular depth) may also be provided.

In some embodiments, the received inputs define one or more characteristics of a path for a user's gaze to follow. An example of this is using a mouse to trace a path for the gaze direction to follow, and the provision of one or more inputs relating to the gaze speed and depth as appropriate. Alternatively, the received inputs may be used to define a point of focus for a simulated gaze to follow—an example of this is the use of a three-dimensional input (such as the movement of a motion-tracked handheld device) that can be used to define the location of a viewed object for the simulated gaze.

At a step 610 processing is applied to one or more of the received inputs so as to generate eye motion that corresponds to the received inputs. In other words, this step generates a simulated gaze which corresponds to the received inputs. For instance, an input defining a path may be used as the basis for defining a realistic eye motion that mimics the path that is input.

At a step 620 an output is generated that relates to the simulated eye motion; in other words, information defining the motion of a simulated gaze is output. In some embodiments, this may include the generation of gaze tracking data that identifies the generated eye motion—such data may be used as an input to a computer game or the like to control one or more aspects of processing. Alternatively, or in addition, eye motion data that is indicative of the simulated gaze is output (such as eye rotation parameters, rather than a change in focal point of the gaze). Such information may be provided to a gaze tracking arrangement to replace an input of a camera view of a user's eyes, for instance.

The term 'realistic eye motion' refers to the fact that eye motion is more complex than a simple path—while a path may be represented using a simple line or curve, an equivalent eye motion by a user may be much less simple.

Eye motion can be broken down into four basic types; these are saccades, smooth pursuit movements, vergence movements, and vestibular-ocular movements. The generation of realistic eye motion must therefore take into account these types of eye motion, and reproduce them in an appropriate manner for the indicated path.

Saccades, and on a smaller scale micro-saccades, are identified as fast motions in which the eyes rapidly move between different points of focus (often in a jerky fashion).

This may be considered as ballistic motion, in that once the movement has been initiated it cannot be altered. Saccades are often not conscious eye motions, and instead are performed reflexively to survey an environment. Saccades may last up to two hundred milliseconds, depending on the distance rotated by the eye, but may be as short as twenty milliseconds. The speed of a saccade is also dependent upon the total rotation angle; typical speeds may be between two hundred and five hundred degrees per second.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head. Such motion may be useful to simulate as it can be indicative of a response to head motion by the user.

Another type of motion is that of the vergence accommodation reflex. This is the motion that causes the eyes to rotate to converge at a point, and the corresponding adjustment of the lens within the eye to cause that point to come into focus. Such a motion may be useful to simulate as it can be indicative of a change of depth for a viewed target.

Further eye motions that may be observed as a part of a gaze tracking process are those of blinks or winks, in which the eyelid covers the eyes of the user. Such motions may be reflexive or intentional, and can often interfere with eye tracking as they will obscure vision of the eye, and the eye is often not stationary during such a motion. It may therefore be considered advantageous to incorporate such movement into the simulated eye motion so as to generate a realistic data set. In some cases these may be introduced to the generated gaze information randomly, or they may be generated in response to events within the content that the gaze information is to be used with—for instance, when testing a game, the generated motion information may include simulated blinks when the brightness of the game images increases rapidly.

In some embodiments it may be considered that the received inputs do not have a one-to-one mapping with generated eye motion. In other words, a number of different realistic eye motions may be generated for the same path—particularly if one or more characteristics of the path (such as the time taken to navigate the path) are not specified or a range of values are specified. For instance, a straight-line path could be represented by a single smooth-pursuit motion, or of a number of saccades in dependence upon any points of focus in between the start and end point and the speed of the motion. Even if characteristics are well-defined, variation in involuntary movements (such as saccades) may still give rise to different motion corresponding to the same path. Such variations may also be dependent upon factors such as a level of interest or focus on the gaze target, for example, or the presence of visual distractions elsewhere in the user's field of view.

The realistic eye motion may be generated using a model of eye motion that can be defined in any suitable way. For instance, a mapping between an input and one or more outputs may be defined manually by a developer. For instance, received inputs could be mapped to an eye motion using a look-up table or the like that links the inputs to characteristics of eye motion. The entries in the look-up table may be based upon physical characteristics (such as knowledge about when particular motions are performed by the eyes), or measured responses to stimuli as a part of a calibration process.

Such a calibration process may include tracking the eye motion of a number of users while presenting them with visual stimuli in a manner that simulates a drawn path. For instance, a user may be provided with a view of an object on a display that moves in a particular pattern (that is, following a particular path) so that a resulting eye motion can be tracked. The calibration may further include depth variations of visual stimuli to encourage vergence accommodation motions, different speeds (or discrete changes in position, rather than continuous motion) of visual stimuli motion to ensure that both saccadic and smooth pursuit motions are observed.

Alternatively, or in addition, a machine learning model may be trained that is able to recreate a realistic eye motion or gaze tracking path in dependence upon the received inputs. In order to generate a dataset for training such a model gaze tracking data for real users may be gathered and associated with a path (and/or one or more other inputs that may be provided). One example of generating such information for training is that of having a set of users each follow a visual element on a display (or a real-world object) while being subjected to gaze tracking techniques. The motion of the visual element can be related to a path to be tracked, with variations in the motion (such as varying movement speed, distance from the user, and continuous/discrete movement) being used to generate a suitably large dataset for training a model. Similarly, such training may include asking users to view a particular object while having their gaze tracked to determine points of interest for an object (such as the eyes when viewing a human face).

An example of a suitable implementation of a gaze simulation process may be that of a generative adversarial network, in which a generative model receives inputs (such as a path) and generates simulated gaze information. The simulated gaze information (and in some embodiments, the received inputs) may then be provided to a discriminator that is trained to distinguish between realistic and unrealistic gaze information (and in some embodiments, determine if the simulated gaze information corresponds to the received inputs).

In a further example, a machine learning model may be trained using only input eye motion or gaze tracking information (that is, trained without received inputs). In such examples, the machine learning model may be trained to determine a motion associated with the gaze information or eye motion—for instance, identifying an initial and a final gaze direction of an input eye motion, or otherwise dividing the input eye motion into segments with well-defined start and end points. From this information, it may be possible to generate a model that is capable of defining a realistic eye motion when provided with inputs that indicate at least a start and end point of a motion.

In any of the eye motion simulation processes, it is considered that information about video content (such as a game that is being tested, or other software) may be incorporated into the simulation to generate more realistic responses. For example, the type of environment may influence how the user's gaze varies—saccades when viewing a human face will be different to when viewing a tree, for instance. Similarly, brightness or the like may influence blinking and as such may be useful to consider. Such simulations may therefore be tailored to specific scenes or content more generally, and/or the output gaze information may include conditions for different events that modify the simulated gaze when reproduced for processing purposes.

In some embodiments, non-typical eye motion may also be considered during the training or other simulated eye motion generation process. This may be useful in that a robustness of a gaze tracking process to atypical users (such as those with impaired vision, for example short-sightedness or a lazy eye) may be tested without requiring explicit testing by users with such conditions.

Figure 7:
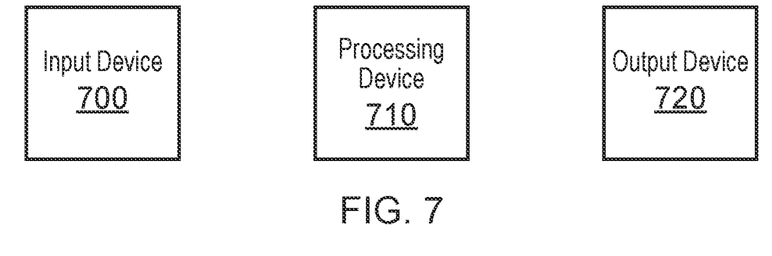
FIG. 7 schematically illustrates a gaze information generating system.

FIG. 7 schematically illustrates a hardware arrangement for implementing methods according to one or more of the embodiments presented in this disclosure. This arrangement comprises an input device 700, a processing device 710, and an output device 720.

The input device 700 is a hardware element (or in some embodiments, a number of hardware elements) that receives one or more inputs from a user that are used to define parameters for the generation of simulated gaze information. In some embodiments, the input device 700 may be a mouse or keyboard, or a gamepad, configured to enable a user to provide inputs to a processing device. Alternatively, or in addition, the input device 700 may be a device that is tracked in two or three dimensions (for example, using hardware motion detectors such as accelerometers, or using a camera-based tracking solution) such as a motion-tracked controller or an HMD.

In some embodiments a number of devices may be used to generate a suitable input for generating the simulated gaze information—for instance, a motion-tracked controller may be used to generate a path with a user modifying or otherwise characterising the path with additional inputs (such as a speed modification) from the same device (via button presses or additional motion-based inputs) and/or from an additional device such as a mouse or keyboard.

In some examples a user may be presented with imagery for a virtual scene (such as an in-game environment) so as to add context to the inputs that are provided via the input device 700. The virtual scene that is shown need not match the context in which the simulated gaze information is to be used, although in some embodiments it may be considered advantageous if they are the same or at least similar.

The processing device 710 is operable to receive the inputs from a user as captured by the input device 700. The processing device 710 is then operable to generate motion data in dependence upon the received inputs, wherein the motion data comprises simulated gaze information such as simulated eye motion and/or simulated gaze direction information. The processing device 710 can be embodied by any suitable hardware, such as a personal computer (comprising a central processing unit and/or graphics processing unit), cloud computing arrangement, or an entertainment device such as a games console.

In a number of embodiments, the processing device 710 is also operable to perform one or more processing tasks in dependence upon the output generated motion data. Alternatively, or in addition, the output data may be stored as part of a simulated gaze information dataset or used by other processing devices. Examples of processing include the use of the motion data in a game or the like as part of a testing process.

The output device 720 is operable to provide the generated motion data to a storage unit (not shown) and/or a process that utilises the motion data. The output device 720 may be omitted (or considered a part of the processing device 710) in some embodiments, for example those in which the processing device 710 both generates and uses the simulated gaze information. In some embodiments, the output device 720 may comprise a network connection that enables communication between the processing device 710 and an external processing device that is configured to utilise the simulated gaze information.

In some examples, the output device 720 is operable to generate a signal that is in a suitable format to replace the output of a gaze tracking arrangement directly. An example of this is generating a signal in the same format as the output of an HMD's gaze tracking elements such that the motion data can be utilised in the process without modification of the process. In such embodiments, the output device 720 may be configured to perform a motion data conversion or reformatting in order to ensure compatibility with the process and/or a hardware arrangement (such as a particular HMD or games console) that is used by the process. The output unit 720 may therefore be configured to provide data to a processing device (such as the processing device 710), either directly or via an HMD. In the former case, the output unit 720 may be configured to appear as an HMD to the processing device to which data is provided.

In some embodiments, the output device 720 may comprise an eye motion reproduction unit operable to reproduce eye motion in dependence upon the output generated motion data. In some cases, this may comprise a physical replica of a pair of eyes that are operated in dependence upon the received motion data such that a standard gaze tracking process can be utilised with the motion data. For instance, the eye motion reproduction unit may comprise models of eyes that are controlled using micro-electromechanical systems (MEMS) to generate rotations of the model eyes. MEMS are of course only one example of a control system for such an arrangement, and any other system may be used instead (or in addition).

Similarly, the eye motion reproduction unit may instead comprise a display unit that generates a virtual replica of a pair of eyes (that is, a pair of eyes that are presented on a display unit) which are rendered with particular eye motions to correspond to the motion data. Such arrangements may be beneficial in that the cameras associated with a gaze tracking arrangement may also be tested, as well as other components associated with generating the gaze tracking information, rather than testing the processing side of the arrangement (such as how a game reacts to a particular gaze input).

Figure 8:
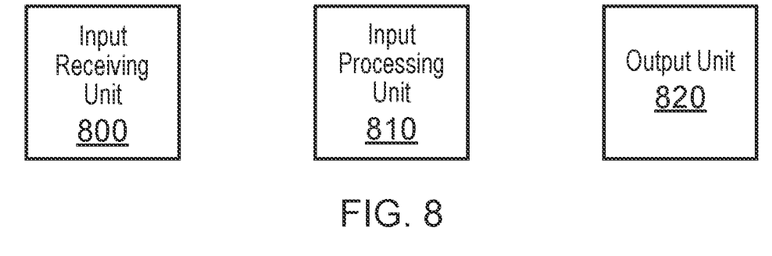
FIG. 8 schematically illustrates a system for generating motion data.

FIG. 8 schematically illustrates a system for generating motion data for a gaze tracking system. This system comprises an input receiving unit 800, an input processing unit 810, and an output unit 820. In some embodiments these units may be provided in a single processing device (such as the processing device 710 of FIG. 7), or the functionality of these units may be distributed between a number of different devices as appropriate. For example, in some embodiments the input processing unit 810 may be implemented remotely using a cloud processing arrangement, with the other units being provided locally to a user. It is considered that the arrangement of FIG. 8 may be used in conjunction with one or more of the elements of FIG. 7, for example by receiving inputs from the input device 700 or transmitting outputs to (or via) the output unit 720.

The input receiving unit 800 is operable to receive one or more inputs; these inputs may be received from the input device 700 of FIG. 7, or from any other sources (including hardware arrangements or software used to generate inputs).

In some embodiments, the one or more inputs comprise a two-dimensional path drawn by a user. An example of this is a path drawn using a computer mouse, for instance. Alternatively, or in addition, the one or more inputs comprise a three-dimensional path drawn by a user. An example of this is a path drawn using a motion-tracked handheld controller, for instance.

The one or more inputs that are provided to the receiving unit 800 may comprise information that is used to characterise the simulated gaze information. Examples of this information include one or more of a velocity, speed, depth, and/or level of focus. Such information may therefore characterise one or both of the gaze of a user and the user themselves corresponding to that gaze, each of which can be used for generating a simulated gaze.

The input processing unit 810 is operable to generate motion data in dependence upon the received inputs, wherein the motion data comprises simulated gaze information. In some embodiments the simulated gaze information comprises simulated gaze direction information; that is, the gaze information comprises direct information about how the gaze changes over time. This may be provided as a three-dimensional path or the like, for instance. Rather than specifically defining a path, the one or more inputs may comprise information defining a start position, an end position, and a duration of an eye motion to be simulated.

Alternatively, or in addition, the simulated gaze information may comprise simulated eye motion for at least one eye. This is different to the gaze direction information in that is relates specifically to the position and/or orientation of the eyes themselves. Simulated eye motion may be represented by angular changes in the orientation of one or two simulated eyes over time, for example. Such information may be used to replace camera measurements during a simulated gaze tracking process, for instance, or for recreating visual simulations (such as using the eye motion reproduction unit discussed above) of the eye motion for gaze tracking.

In some embodiments the input processing unit 810 is operable to configure two or more sets of motion data corresponding to the received inputs. For instance, given a single set of inputs the input processing unit 810 may generate two or more different sets of simulated gaze information that represent unique gazes. While these different sets of gaze information may share a number of characteristics, such as a start point of a path, an end point of a path, and/or a duration of the gaze motion, the sets may be unique in other respects (such as the number of saccades, or the path of the gaze between the start and end points). In some embodiments, this may be implemented by incorporating a random element into the gaze information generation process and/or by using models representing different virtual (or real) users with the same inputs.

The output unit 820 is operable to output the generated motion data. The output unit 820 may be operable to output the motion data to any one or more different devices and/or processing units—examples include computers, games consoles, storage devices, and cloud processing arrangements.

The arrangement of FIG. 8 is an example of a processor (for example, a GPU and/or CPU located in a games console or any other computing device) that is operable to generate motion data for a gaze tracking system, and in particular is operable to:
receive one or more inputs;
generate motion data in dependence upon the received inputs, wherein the motion data comprises simulated gaze information; and
output the generated motion data.

Figure 9A:
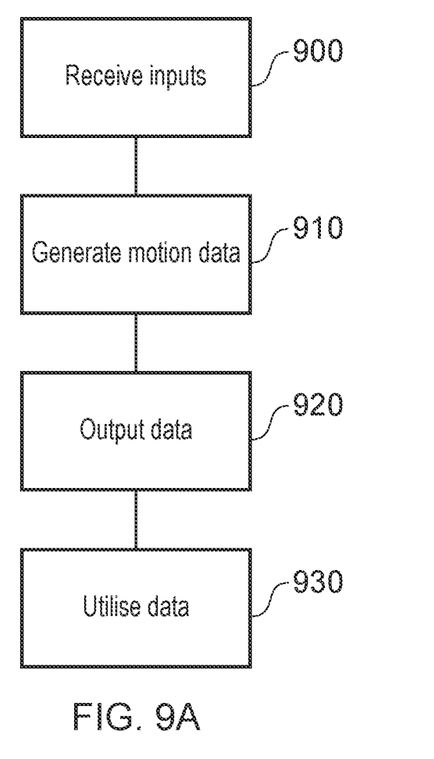
FIGS. 9A and 9B schematically illustrate data generation and processing methods.
Figure 9B:
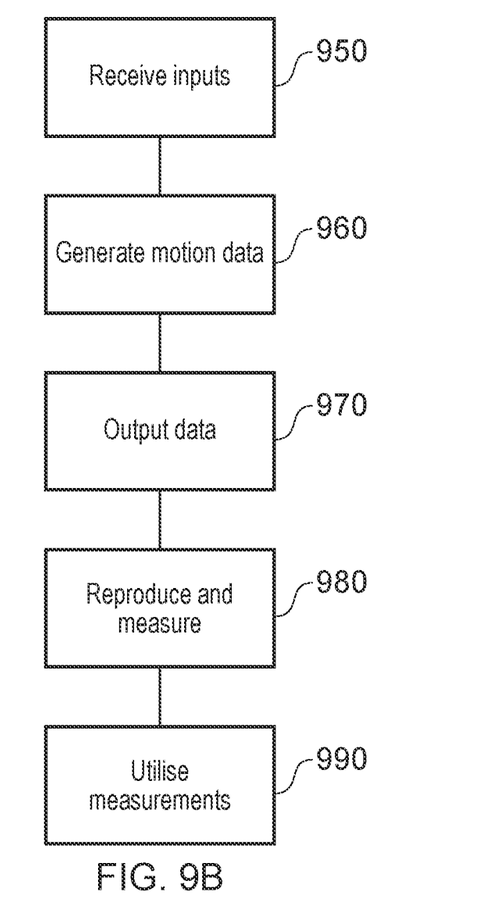

FIGS. 9A and 9B schematically illustrate methods for implementing one or more embodiments of the present disclosure.

FIG. 9A shows an exemplary method in which simulated gaze information is provided directly to a processing device, bypassing an HMD. In such embodiments, the simulated gaze information may comprise simulated gaze direction information indicating a focal point of the simulated gaze over time.

A step 900 comprises receiving one or more inputs from a user, such as a two- or three-dimensional path drawn by the user and/or one or more characteristics that define attributes of a path or other gaze motion.

A step 910 comprises generating motion data in dependence upon those received inputs; this may be performed in accordance with any of the embodiments described above. For instance, one or more look-up tables, gaze models, and/or trained machine learning models may be used to convert the received inputs into one or more sets of motion data that represent simulated gaze information.

A step 920 comprises outputting the generated motion data to a processing device that is configured to perform one or more processing tasks. In some embodiments, this may be an output to another processing task performed by the same device, rather than the output being required to be directed towards a separate processing device. Examples of such devices include games consoles and personal computers.

A step 930 comprises using the generated motion data as an input to a process, such as a computer game or other software, in the place of gaze information generated directly from observation of a user's eyes. For instance, the generated motion data may be formatted so as to appear to be the same as the output of an HMD's gaze tracking process such that no modification to the software is required to utilise the data.

FIG. 9B shows an exemplary method in which simulated gaze information is provided to a reproduction device that is used with gaze-tracking hardware. In such embodiments, the simulated gaze information may comprise simulated eye motion for at least one eye.

A step 950 comprises receiving one or more inputs from a user, such as a two- or three-dimensional path drawn by the user and/or one or more characteristics that define attributes of a path or other gaze motion.

A step 960 comprises generating motion data in dependence upon those received inputs; this may be performed in accordance with any of the embodiments described above. For instance, one or more look-up tables, gaze models, and/or trained machine learning models may be used to convert the received inputs into one or more sets of motion data that represent simulated eye motion (and therefore indicate a changing simulated gaze direction).

A step 970 comprises outputting the generated motion data to a gaze information reproduction device. As noted above, examples of such devices include a display which renders images of eyes that are suitable for tracking and hardware in which replica eyes are provided and are able to be manipulated (so as to generate at least a rotation) in accordance with the generated motion data.

A step 980 comprises reproducing eye motion corresponding to the generated motion data at the gaze information reproduction device, and measuring the reproduced motion using one or more gaze tracking arrangements. For instance, a display may be mounted within an HMD which has gaze tracking cameras—the display may be controlled to reproduce images of simulated eye motion, while the gaze tracking cameras with the HMD record the motion and output corresponding gaze tracking information.

A step 990 comprises using the gaze tracking information generated in step 980 as an input to a process, such as a computer game or other software, in the place of gaze information generated directly from observation of a user's eyes. In some embodiments this may require no modification to the process, as the output of the gaze tracking arrangement is consistent with the output when measuring a real user's gaze.

While the above discussion has focused on the use of generated gaze information for the purpose of quality assurance and bug testing for software, it is considered that the advantages may extend beyond this. For example, some users may not have access to gaze tracking hardware (or may be otherwise unable to use it, due to accessibility issues with the hardware). Embodiments of the present disclosure may be used to provide those users with a way of generating gaze inputs using alternative inputs so as to provide a realistic experience of interacting with gaze-controlled (or gaze-influenced) content. By generating realistic gaze information for these alternative inputs, a more natural interaction with the content may be realised in a number of cases.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. An input generation system operable to generate motion data for a gaze tracking system, the system comprising:
   an input receiving unit operable to receive one or more inputs;
   an input processing unit operable to generate motion data in dependence upon the received inputs, wherein the motion data comprises simulated gaze information; and
   an output unit operable to output the generated motion data,
   wherein the one or more inputs comprises information that is used to characterise the simulated gaze information.

2. A system according to clause 1, wherein the one or more inputs comprise a two-dimensional path drawn by a user.

3. A system according to clause 1, wherein the information comprises one or more of a velocity, speed, depth, and/or level of focus.

4. A system according to any preceding clause, wherein the one or more inputs comprise a three-dimensional path drawn by a user.

5. A system according to any preceding clause, wherein the simulated gaze information comprises simulated gaze direction information.

6. A system according to any preceding clause, wherein the simulated gaze information comprises simulated eye motion for at least one eye.

7. A system according to any preceding clause, wherein the input processing unit is operable to configure two or more sets of motion data corresponding to the received inputs.

8. A system according to any preceding clause, wherein the input processing unit is operable to utilise a trained machine learning model to generate simulated gaze information.

9. A system according to any preceding clause, wherein the one or more inputs comprises information defining a start position, an end position, and a duration of an eye motion to be simulated.

10. A system according to any preceding clause comprising a processing device operable to perform one or more processing tasks in dependence upon the output generated motion data.

11. A system according to any preceding clause comprising an eye motion reproduction unit operable to reproduce eye motion in dependence upon the output generated motion data.

12. A method for generating motion data for a gaze tracking system, the method comprising:
   receiving one or more inputs;
   generating motion data in dependence upon the received inputs, wherein the motion data comprises simulated gaze information; and
   outputting the generated motion data.

13. Computer software which, when executed by a computer, causes the computer to carry out the method of clause 12.

14. A non-transitory machine-readable storage medium which stores computer software according to clause 13.

The invention claimed is:

1. An input generation system operable to generate motion data for a gaze tracking system, the system comprising:
   an input receiving unit operable to receive one or more inputs from an input device operated by a user, the one or more inputs operating to cause the input generation system to change imagery of a virtual scene;
   an input processing unit operable to generate motion data in dependence upon the received inputs, wherein the motion data comprises simulated gaze information, where the simulated gaze information is generated from the one or more inputs by the user that do not include any actual gaze tracking information obtained from a user's eyes; and
   an output unit operable to output the generated motion data, wherein the one or more inputs comprises information that is used to characterise the simulated gaze information.

2. The system of claim 1, wherein the one or more inputs comprise a two-dimensional path drawn by a user.

3. The system of claim 1, wherein the information comprises one or more of a velocity, speed, depth, and/or level of focus.

4. The system of claim 1, wherein the one or more inputs comprise a three-dimensional path drawn by a user.

5. The system of claim 1, wherein the simulated gaze information comprises simulated gaze direction information.

6. The system of claim 1, wherein the simulated gaze information comprises simulated eye motion for at least one eye.

7. The system of claim 1, wherein the input processing unit is operable to configure two or more sets of motion data corresponding to the received inputs.

8. The system of claim 1, wherein the input processing unit is operable to utilise a trained machine learning model to generate simulated gaze information.

9. The system of claim 1, wherein the one or more inputs comprises information defining a start position, an end position, and a duration of an eye motion to be simulated.

10. The system of claim 1, comprising a processing device operable to perform one or more processing tasks in dependence upon the output generated motion data.

11. The system of claim 1, comprising an eye motion reproduction unit operable to reproduce eye motion in dependence upon the output generated motion data.

12. A method for generating motion data for a gaze tracking system, the method comprising:
　　receiving one or more inputs from an input device operated by a user, the one or more inputs operating to cause the input generation system to change imagery of a virtual scene;
　　generating motion data in dependence upon the received inputs, wherein the motion data comprises simulated gaze information, where the simulated gaze information is generated from the one or more inputs by the user that do not include any actual gaze tracking information obtained from a user's eyes; and
　　outputting the generated motion data.

13. A non-transitory machine-readable storage medium which stores computer software which, when executed by a computer, causes the computer to perform a method for generating motion data for a gaze tracking system, the method comprising:
　　receiving one or more inputs from an input device operated by a user, the one or more inputs operating to cause the input generation system to change imagery of a virtual scene;
　　generating motion data in dependence upon the received inputs, wherein the motion data comprises simulated gaze information, where the simulated gaze information is generated from the one or more inputs by the user that do not include any actual gaze tracking information obtained from a user's eyes; and
　　outputting the generated motion data,
　　wherein the one or more inputs comprises information that is used to characterise the simulated gaze information.

* * * * *